United States Patent [19]

Cunnell

[11] 4,043,201
[45] Aug. 23, 1977

[54] FLUID PRESSURE TRANSDUCER

[75] Inventor: Michael Derek Cunnell, Salisbury, England

[73] Assignee: Lucas Electrical Limited, Birmingham, England

[21] Appl. No.: 682,866

[22] Filed: May 3, 1976

[51] Int. Cl.² ............................................. G01L 9/00
[52] U.S. Cl. .................................. 73/398 AR; 73/406
[58] Field of Search ............. 73/398 AR, 406, 407 R, 73/398 R, 410; 338/41, 42, 36

[56] References Cited

U.S. PATENT DOCUMENTS

| | | | |
|---|---|---|---|
| 3,238,487 | 3/1966 | Le Van et al. | 338/41 |
| 3,445,801 | 5/1969 | Sattler | 338/42 |
| 3,525,262 | 8/1970 | Goran | 73/398 AR |
| 3,786,210 | 1/1974 | Byam | 338/42 |

FOREIGN PATENT DOCUMENTS

| | | | |
|---|---|---|---|
| 468,061 | 11/1928 | Germany | 73/398 AR |

*Primary Examiner*—Donald O. Woodiel
*Attorney, Agent, or Firm*—Ladas, Parry, Von Gehr, Goldsmith & Deschamps

[57] ABSTRACT

A fluid pressure transducer includes a hollow body divided into first and second compartments which are sealed from one another, the first compartment being connected, in use, to a first source of fluid at a pressure to be monitored, while the second compartment is connected to a reference source. The compartments include a common wall which is deformable in response to variations in the pressure of the first fluid source as compared to that of the reference source, and received within the body are a carrier and a first abutment member which are capable of relative movement towards and away from one another in resonse to deformation of the common wall. A plurality of further abutment members are resiliently supported by the carrier and arranged so as to become engaged with or disengaged from respective portions of the first abutment member at different positions of the first abutment member relative to the carrier. Thus in use the number of said further members engaging said first member varies in accordance with variations in the pressure of the first fluid source as compared to that of the reference source, means therefore being provided for producing an output dependent upon the number of said further members engaging the first member.

9 Claims, 3 Drawing Figures

FLUID PRESSURE TRANSDUCER

This invention relates to a fluid pressure transducer.

A fluid pressure transducer, according to the invention, includes a hollow body divided into first and second compartments which are sealed from one another, the first compartment being connected, in use, to a first source of fluid at a pressure to be monitored, while the second compartment is connected to a reference source, said compartments including a common wall which is deformable in response to variations in the pressure of said first fluid source as compared to that of said reference source, a carrier and a first abutment member which are received within the body and which are capable of relative movement towards and away from one another in response to deformation of said common wall, a plurality of further abutment members resiliently supported by the carrier and arranged so as to become engaged with or disengaged from respective portions of the first abutment member at different positions of the first abutment member relative to the carrier whereby in use the number of said further members engaging said first member varies in accordance with variations in the pressure of said first fluid source as compared to that of said reference source, and means for producing an output dependent upon the number of said further members engaging the first member.

Preferably, said carrier is fixed and said first abutment member is movable towards and away from the carrier in response to deformation of said wall.

Preferably, said further abutment members are resiliently urged towards positions in which they extend by different distances from a surface of the carrier presented to a generally planar surface of said abutment member.

Preferably, said further abutment members are defined by plungers which project at the free ends from said surface of the carrier.

Preferably, said first and said further abutment members are electrically conductive, and insulating material is provided between adjacent further abutment members.

Preferably, said means produces an electrical output signal and includes a circuit board supported by the carrier, the electrical connections between the circuit board and the further abutment members being provided by conductive springs which resiliently urge said further members towards said positions.

Preferably, said common wall forms at least part of a resilient diaphragm, or alternatively forms part of a bellows unit.

Preferably, movement of said first abutment member in response to deformation of said wall is guided by a rod projecting from the abutment member and slidably received in a bore in the carrier.

Preferably, movement of said first abutment member away from said carrier is limited by a stop.

Preferably, said second compartment is vented to atmosphere.

In the accompanying drawings, which illustrate one example of the invention,

Figure 1:
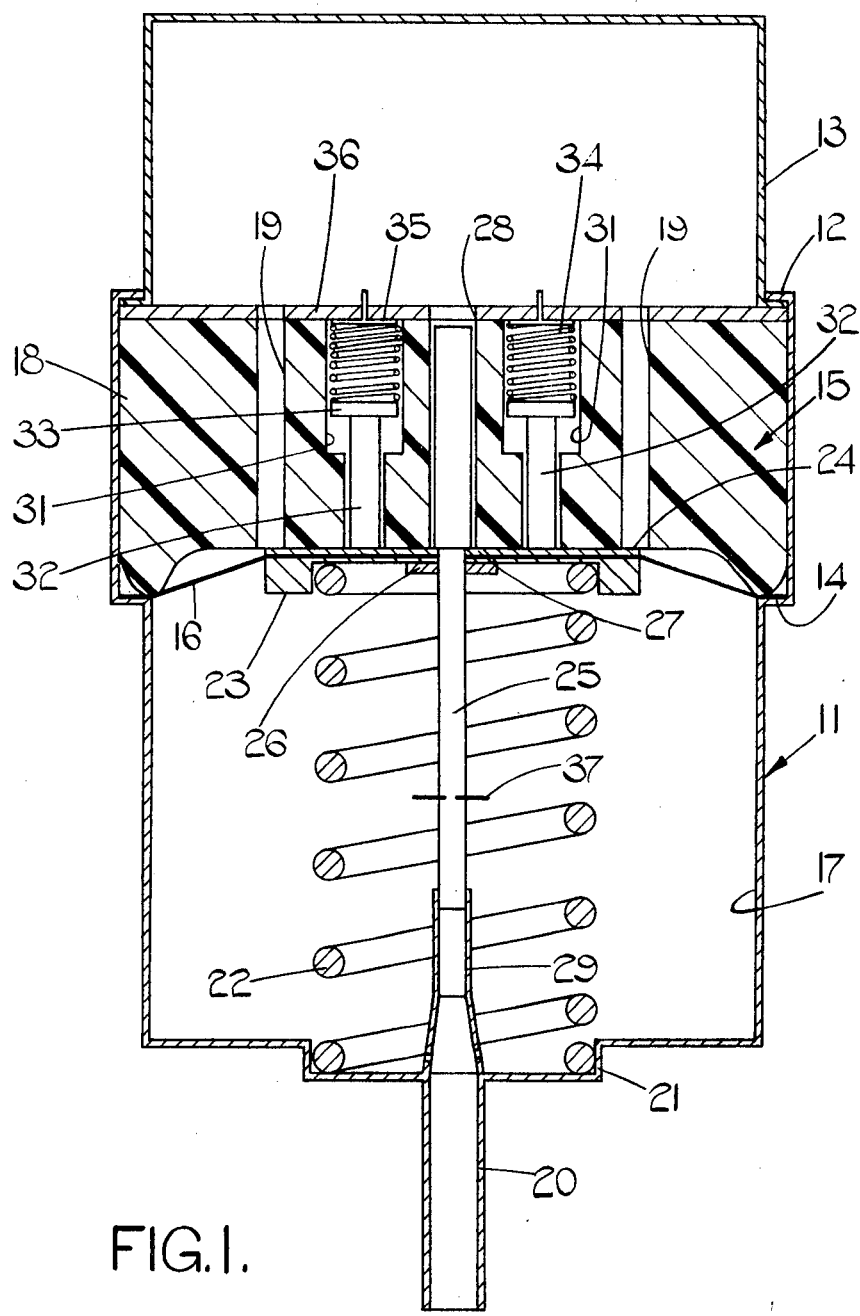
FIG. 1 is a sectional view of a transducer.

Referring to the drawings, the transducer includes a hollow, generally cup-shaped metal body 11 which at its open end is formed with an inturned lip 12 and is closed, but not sealed, by an end cap 13. Trapped between the lip 12 and an inwardly directed shoulder 14 defined by the body 11 is a generally cylindrical, insulating, synthetic resin carrier 15 which in turn traps the periphery of a resilient diaphragm 16 against the shoulder 14. The diaphragm 16 thereby divides the interior of the body 11 into first and second compartments 17, 18 respectively which are sealed from one another by the diaphragm. In use, the compartment 18 is connected to atmosphere by way of vent holes 19 in the carrier 15, whereas the compartment 17 is connected to a source of fluid at a pressure which is to be monitored by way of a conduit 20 integral with the base of the body 11. In this particular example, the compartment 17 must be connected to a fluid source at a pressure below atmospheric pressure and conveniently is connected to the inlet manifold of an internal combustion engine so that the transducer serves to monitor the pressure in the inlet manifold.

The base of the body 11 defines a recess 21 which receives one end of a helical compression spring 22, the other end of which is received by a retaining plate 23 carried by the diaphragm 16 at its surface remote from the carrier 15. At its opposite surface, the diaphragm 16 carries a generally planar, brass contact plate 24, while a guide rod 25 extends through the diaphragm 16 and plates 23, 24 so as to trap the plates in position between a circlip 26 carried by the guide rod and a shoulder 27 integral with the guide rod. At one end, the guide rod 25 is received as a sliding fit in an axially extending, centrally disposed bore 28 formed in the carrier 15, while its opposite ends is slidably received in an internal, elongated extension 29 of the conduit 20, the extension 29 being coaxial with the bore 28. Thus, as the diaphragm 16 moves towards and away from the carrier 15 in use, the guide rod 25 serves to ensure that the plate 24 remains perpendicular to the cylindrical axis of the carrier 15. Preferably, movement of the plate 24 away from the carrier 15 is limited by a stop 37 carried by the guide rod 25 and engageable with the free end of the extension 29.

Figure 2:
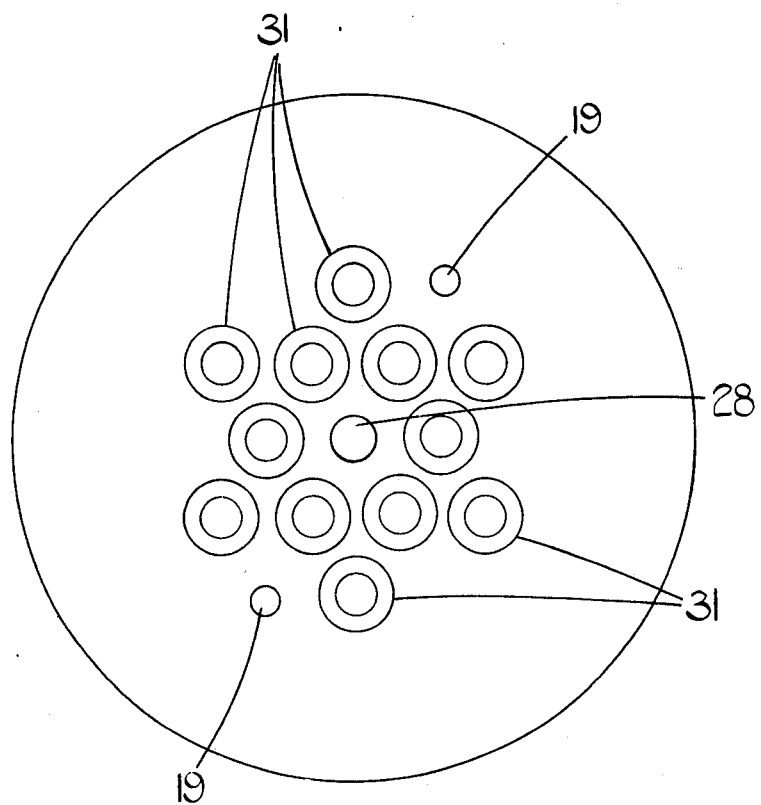
FIG. 2 is a plan view of the carrier of the transducer with the plungers omitted.

The carrier 15 is also formed with twelve further, axially extending bores 31 which are stepped so as to define narrow portions at the end of the carrier adjacent the plate 24 and which are arranged around the bore 28 as shown in FIG. 2. Slidably mounted in the bores 31 are respective, conductive plungers 32 each formed with an integral, expanded head part 33 which is received in the wide portion of its associated bore 31. Also received in each bore 31 is a helical compression spring 34 which is trapped between the associated head part 33 and a respective contact member 35 carried by an insulating closure plate 36 secured to the end of the carrier 15 remote from the plate 24. The carrier 15 is formed so that the steps in the bores 31 are arranged at different distances from the surface of the carrier adjacent the plate 24. Moreover, the plungers 32 are of equal length and are urged by the springs 34 towards positions in which their head parts 33 engage the steps in the associated bores 31. Thus the plungers 32 are urged by the springs 34 to positions in which the free ends of the plungers project by different distances from the surface of the carrier 15 adjacent the plate 24. However, the spring 22 is compressed between the plate 23 and the base of the body 11 and hence the diaphragm 16 is normally urged to a configuration such that the plate 24 is in contact with the carrier 15. Thus, provided the pressures in the compartments 17, 18 are the same, the plungers 32 are held by the plate 24 such that their head parts 33 are spaced from the steps in the associated bores 31. This is of course the situation shown in FIG. 1. However, when the transducer is in use and the pressure in the compartment 17 falls below atmospheric pressure, the diaphragm 16 is deformed so that the plate 24 moves away from the carrier 16, which movement is of course guided by the rod 25. As the plate 24 moves away from the carrier, each plunger 32 is urged by its associated spring 34 to move with the plate 24 until the head part 33 of the plunger engages the step in the associated bore 31. The plunger 32 then remains disengaged from the plate 24 during continued movement thereof away from the carrier 15.

It will therefore be seen that when the pressures in the compartments 17, 18 equal all the plungers 32 engage the plate 24, but as the pressure in the compartment 17 falls below that in the compartment 18 the plungers become disengaged from the plate 24 consecutively. Thus, when the transducer is in use, the number of plungers 32 engaging the plate 24 can be used to provide a measure of the difference in pressure between the compartments 17, 18. This is conveniently effected by positioning a circuit board (not shown) on the plate 36 so that conductive areas on the board engage the contact members 35 respectively. In this way, an electrical connection between each conductive area and the contact plate 24 is completed by way of the respective spring 34 and plunger 32 when the plunger engages the contact plate, but is broken when the plunger becomes disengaged from the plate. Thus the circuit board is arranged to produce an electrical signal representing the number of electrical connections between the conductive areas on the board and the plate 24. This signal is then converted into a binary output by the logic circuit shown in FIG. 3.

Figure 3:
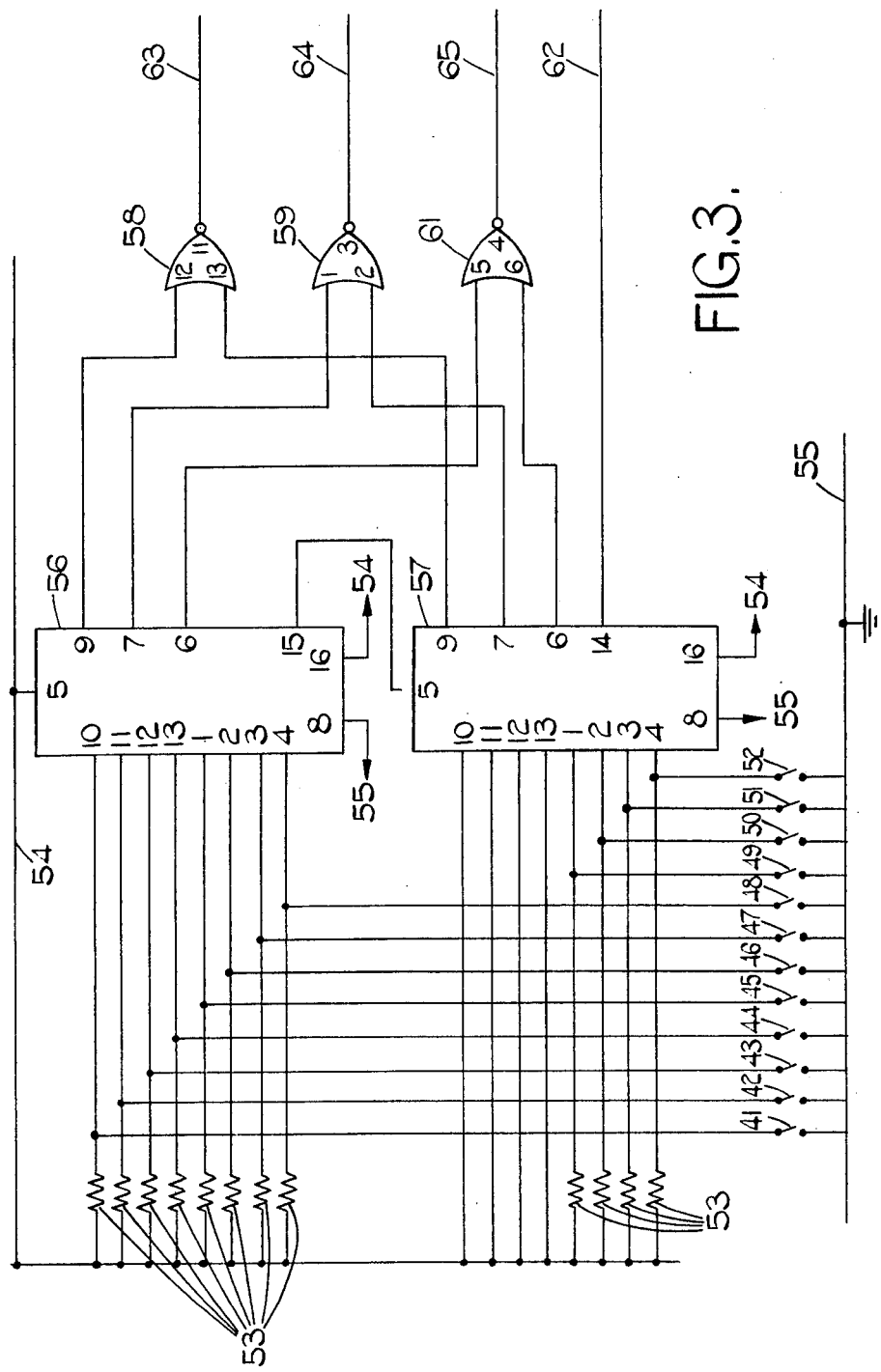
FIG. 3 is a circuit diagram of a logic circuit for converting the output from the transducer into a binary signal.

In the circuit of FIG. 3, the plungers 32 and the contact plate 24 are for the sake of convenience shown as twelve separate switches 41 to 52 respectively, each of the switches being connected in series with a respective 100K ohm resistor 53 between a positive supply line 54 and an earthed supply line 55. The junctions of the switches 41 to 48 and their associated resistors 53 are connected to the number 10, 11, 12, 13, 1, 2, 3 and 4 terminals respectively of a first cmos priority encoder 56 (Motorola integrated circuit type No. MC14532) having its number 5 and 16 terminals connected to the supply line 54 and its number 8 terminal connected to the supply line 55. In addition, the encoder 56 has its number 15 terminal connected to the number 5 terminal of an identical second encoder 57, its number 9 terminal connected to one input terminal of a first cmos NOR gate 58 (¼ Motorala integrated circuit type No. MC14001) and its 7 and 6 terminals connected to respective input terminals of second and third identical NOR gates 59, 61 respectively. The encoder 57 has its number 1, 2, 3 and 4 terminals connected to the junctions respectively of the switches 49 to 52 and their associated resistors 53, its number 10, 11, 12, 13 and 16 terminals connected to the supply line 54, its number 8 terminal connected to the supply line 55 and its number 9, 7 and 6 terminals connected to the other input terminals of the NOR gates 58, 59 and 61 respectively. The remaining number 14 terminal of the encoder 57 and the output terminals of the NOR gates 58 to 61 are connected to respective output lines 62 to 65 respectively, the signals appearing on these lines in use providing a four bit binary output representing the conditions of the switches 41 to 52 and hence upon the pressure difference between compartments 17, 18.

In a modification (not shown) of the above example, the resilient diaphragm 16 is replaced by a bellows unit which is mounted in the body 11 so that the interior of the bellows unit defines the first compartment which, in use, is connected to the fluid source to be monitored. The contact plate 24 is then provided at an end wall of the bellows unit located adjacent the carrier so as to be movable towards and away from the carrier so as to be movable towards and away from the carrier in response to deformation of the bellows unit.

I claim:

1. A fluid pressure transducer including a hollow body divided into first and second compartments which are sealed from one another, the first compartment being connected, in use, to a first source of fluid at a pressure to be monitored, while the second compartment is connected to a reference source, said compartments including a common wall which is deformable in response to variations in the pressure of said first fluid source as compared to that of said reference source, a carrier mounted in one of said compartments adjacent said common wall and secured to the body, a conductive contact member rigidly secured to said common wall and capable of linear movement towards and away from said carrier in response to deformation of said common wall, a plurality of electrically conductive plungers slidably mounted in respective bores in the carrier and resiliently urged to project from the carrier so as to become engaged with or disengaged from respective portions of said contact member at different positions respectively of said contact member relative to the carrier, whereby in use the number of said plungers engaging said contact member varies in accordance with variations in the pressure of said first fluid source as compared to that of said reference source, and means for producing an electrical output depending upon the number of said plungers engaging said contact member.

2. A transducer as claimed in claim 1, wherein said plungers are resiliently urged towards positions in which they extend by different distances respectively from a surface of the carrier presented to a generally planar surface of said contact member.

3. A transducer as claimed in claim 2, wherein said means includes a circuit board supported by the carrier, the electrical connections between the circuit board and said plungers being provided by conductive springs which resiliently urge said plungers toward said positions.

4. A tranducer as claimed in claim 1, wherein said common wall forms at least part of a resilient diaphragm.

5. A transducer as claimed in claim 1, wherein said common wall forms a part of a bellows unit.

6. A transducer as claimed in claim 1, wherein movement of said contact member in response to deformation of said wall is guided by a rod projecting from said contact member and slidably received in a bore in the carrier.

7. A transducer as claimed in claim 1, wherein movement of said contact member away from said carrier is limited by a stop.

8. A transducer as claimed in claim 1, wherein said second compartment is vented to atmosphere.

9. A transducer as claimed in claim 1, wherein said means includes a logic circuit for producing a binary output representing the pressure difference between said first fluid source and said reference source.

* * * * *